United States Patent
Johnson et al.

(10) Patent No.: US 10,077,647 B2
(45) Date of Patent: Sep. 18, 2018

(54) CONTROL OF A MANAGED PRESSURE DRILLING SYSTEM

(71) Applicant: SCHLUMBERGER TECHNOLOGY CORPORATION, Sugar Land, TX (US)

(72) Inventors: Ashley Bernard Johnson, Cambridge (GB); Stuart Swift, Cambridge (GB)

(73) Assignee: Schlumberger Technology Corporation, Sugar Land, TX (US)

(*) Notice: Subject to any disclaimer, the term of this patent is extended or adjusted under 35 U.S.C. 154(b) by 887 days.

(21) Appl. No.: 14/339,889

(22) Filed: Jul. 24, 2014

(65) Prior Publication Data
US 2016/0024905 A1    Jan. 28, 2016

(51) Int. Cl.
*E21B 44/00* (2006.01)
*G05B 15/02* (2006.01)
*G05D 27/02* (2006.01)
*G05D 7/06* (2006.01)
*E21B 21/08* (2006.01)

(52) U.S. Cl.
CPC .............. *E21B 44/00* (2013.01); *E21B 21/08* (2013.01); *G05B 15/02* (2013.01); *G05D 7/0688* (2013.01); *G05D 27/02* (2013.01)

(58) Field of Classification Search
CPC ....... E21B 44/00; E21B 21/08; G05D 7/0688; G05D 27/02; G05B 15/02
See application file for complete search history.

(56) References Cited

U.S. PATENT DOCUMENTS

| | | |
|---|---|---|
| 2004/0065477 A1 | 4/2004 | Paulk et al. |
| 2005/0092523 A1 | 5/2005 | McCaskill et al. |
| 2006/0175090 A1 | 8/2006 | Reitsma et al. |

(Continued)

FOREIGN PATENT DOCUMENTS

| | | |
|---|---|---|
| WO | 2011036144 A1 | 3/2011 |
| WO | 2011/136761 A1 | 11/2011 |

OTHER PUBLICATIONS

Li, et al., "Integrated Estimator and L1 Adaptive Controller for Well Drilling Systems", American Control Conference, Jun. 10-12, 2009, 6 pages.

(Continued)

*Primary Examiner* — Nathan L Laughlin
(74) *Attorney, Agent, or Firm* — Paula B. Whitten (57) ABSTRACT

A method for controlling a managed pressure drilling system including a drillstring located in a borehole, a pump that delivers drilling fluid, and a choke that controls the flow of the drilling fluid from an annulus formed between the drillstring and the wall of the borehole. During drilling, the drilling fluid flows downwardly through the drillstring from the pump and through a drill bit, and returns through the annulus to the choke. The method includes determining a correction $\Delta V_{corr}$ in the volume of the fluid in the annulus to achieve a target pressure in the fluid; calculating a choke flow rate correction term $\Delta q_{corr}$ by dividing $\Delta V_{corr}$ by a factor related to the acoustic travel time $t_a$ of a pressure wave in the fluid travelling the length of the annulus; and determining a flow demand from the choke on the basis of the flow rate correction term $\Delta q_{corr}$.

11 Claims, 4 Drawing Sheets

(56) References Cited

U.S. PATENT DOCUMENTS

2012/0247831 A1    10/2012   Kaasa et al.
2016/0076322 A1     3/2016   Oddie et al.
2016/0230484 A1     8/2016   Johnson et al.

OTHER PUBLICATIONS

Zhou, et al., "Adaptive output feedback control of a managed pressure drilling system", Decision and Control, 47th IEEE Conference, Dec. 9-11, 2008, 6 pages.

Zhou, et al., "Switched Control for Pressure Regulation and Kick Attenuation in a Managed Pressure Drilling System", Control Systems Technology, IEEE Transactions, vol. 19, Issue 2, 2009, 14 pages.

International Search Report and Written Opinion for the equivalent International patent application PCT/US2015/041726 dated Oct. 6, 2015.

International Preliminary Report on Patentability for the equivalent International patent application PCT/US2015/041726 dated Feb. 2, 2017.

Bourgoyne Jr., et al, "Applied Drilling Engineering," Society of Petroleum Engineers, SPE Textbook Series, vol. 2, 1986.

Massey, "Mechanics of Fluid," Eighth Edition published 2006, Taylor & Francis, London and New York.

CONTROL OF A MANAGED PRESSURE DRILLING SYSTEM

BACKGROUND

Embodiments of the present invention relate to control of a managed pressure drilling system.

In the oilfield/hydrocarbon industry, boreholes/wellbores are drilled into subterranean hydrocarbon reservoirs so that the hydrocarbons can be recovered. In general, a borehole is drilled through an earth formation into a hydrocarbon reservoir and the hydrocarbons are produced through the wellbore. Typically, earth formations are explored for hydrocarbons, the borehole is drilled and then completed—which may comprise lining the borehole with cement and/or casing—and then the hydrocarbons are produced from the borehole, which may require pumps to pump the hydrocarbons up the borehole. Wellbore tools may be used in the borehole, normally suspended on a wireline, to carry out operations in the borehole to provide for the construction and completion of the wellbore and/or the production of the hydrocarbons.

The drilling of a borehole is typically carried out using a steel pipe known as a drillstring with a drill bit on the lowermost end; the drill bit is normally attached to or is a part of a bottomhole assembly attached to the lower end of the drillstring. In a drilling procedure, the entire drillstring may be rotated using an over-ground drilling motor, or the drill bit may be rotated independently of the drillstring using a fluid powered motor or motors mounted in the drillstring just above the drill bit. As drilling progresses, a flow of drilling fluid is used to carry the debris created by the drilling process out of the wellbore. During the drilling procedure, the drilling fluid is pumped through an inlet line down the drillstring, passes through holes of the drill bit, and returns to the surface via an annular space between the outer diameter of the drillstring and the borehole (the annular space is generally referred to as the annulus).

In some drilling systems, as discussed in more detail below, the pressure in the borehole being drilled is controlled in order to optimize the drilling procedure and/or minimize adverse effects affecting the drilling procedure. The drilling system comprises a large dynamic system, a long tube of drill pipe or coiled tubing that is suspended and/or moved within a borehole and a borehole that is full of a fluid that may be flowing through the wellbore at the same time the drill pipe or coiled tubing is in motion. As would be expected, the drilling systems, being large dynamic systems, have resonant properties associated with them.

Drilling fluid is a broad drilling term that may cover various different types of drilling fluids. The term "drilling fluid" may be used to describe any fluid or fluid mixture used during drilling and may cover such things as drilling mud, heavily weighted mixtures of oil or water with solid particles, air, nitrogen, misted fluids in air or nitrogen, foamed fluids with air or nitrogen, aerated or nitrified fluids and. In practice, the flow of drilling fluid through the drillstring may be used to cool the drill bit as well as to remove the cuttings from the bottom of the borehole.

In conventional overbalanced drilling, the density of the drilling fluid is selected so that it produces a pressure at the bottom of the borehole (the "bottom hole pressure" or "BHP"), which is high enough to counter-balance the pressure of fluids in the formation ("the formation pore pressure"). By counter-balancing the pore pressure, the BHP acts to prevent the inflow of fluids from the formations surrounding the borehole into the borehole. However, if the BHP falls below the formation pore pressure, formation fluids, such as gas, oil and/or water may enter the borehole and produce what is known in drilling as a kick. By contrast, if the BHP is high, the BHP may be higher than the fracture strength of the formation surrounding the borehole resulting in fracturing of the formation. When the formation is fractured, the drilling fluid may enter the formation and be lost from the drilling process. This loss of drilling fluid from the drilling process may cause a reduction in BHP and as a consequence cause a kick as the BHP falls below the formation pore pressure. Loss of fluid to the formations as a result of fracturing is known as fluid loss or lost circulation and may be expensive, as a result of lost drilling fluid, and increase the time to drill the borehole. Kicks are also dangerous and the liquid and/or gas surge associated with the influx into the borehole requires handling at surface.

In order to overcome the problems of kicks and/or fracturing of the formation during drilling, a process known as managed pressure drilling ("MPD") has been developed. In managed pressure drilling various techniques are used to control/manage the BHP during the drilling process. In MPD, the flow of drilling fluid into and out of the borehole is controlled. This means that pumps that pump the fluid into the borehole and chokes that control the flow of fluid out of the borehole are controlled to control the BHP. Additionally, gas may be injected into the drilling fluid to reduce the drilling fluid density and thus reduce the BHP produced by the column of the drilling fluid in the drilling annulus. In general, until recently, MPD techniques have been fairly crude relying on manual control of the pumps and choke.

As described above, there are many parameters that may be controlled to control the behaviour of the drilling system. For example, these parameters include the speed of rotation of the drill bit, the weight applied to the drill bit, the orientation of the drill bit and/or the like. At the same time there are also many parameters associated with the drilling fluid that may be varied, such as the pump rate of the drilling fluid, an amount of choke applied to the drilling fluid, a density to the drilling fluid and/or the like. Additionally, wireline systems may extend into a borehole and tools, sensors and/or the like may be operated in the borehole while suspended on the wireline. Operational parameters can then be associated with the operation of such wireline tools and systems. Furthermore, pumps, such as electric submersible pumps ("ESPs") may be used in the borehole to pump drilling fluid into the borehole, to pump production fluids out of the borehole and/or the like. Changes to any of these parameters in a wellbore system may be made singly or in combination to control the drilling/wireline/wellbore/pumping process(es). Control of the parameters may be performed by a person, such as the driller, a processor and/or a person in combination with a processor.

The systems described above comprise dynamic systems in which long lengths of pipe/wireline/tubing are extended from a surface location down a borehole and the pipe/wireline/tubing may be moved therein and/or fluids may be moved through the pipe/tubing and/or the borehole. Increasingly, parameters associated with a wellbore procedure, such as drilling/wireline procedures, pumping procedures and/or the like are sensed and used to provide feedback/input into the ongoing drilling/wireline/pumping procedure. In some procedures, closed loop automation provides for automatically carrying out a wellbore procedure using measurements of the state of the system being used and/or measurements of the effect being produced by operation of the system. Moreover, in the dynamic wellbore systems described above, any motors, pumps and/or other types of machinery that are activated/operated in the borehole, such as mud motors, electric submersible pumps and/or the like will undergo a change in state during their operation and will interact with the drillstring, tubing, wireline, borehole, the column of fluid in the borehole and/or the like, when a change of state occurs.

In systems in which a state of the wellbore system and or the effect of the wellbore system are sensed during a procedure and/or in autonomous and/or semi-autonomous wellbore systems, a state of the wellbore system can be changed based upon sensed/measured properties of the wellbore, the wellbore system, an effect/output of the wellbore system and/or the like. A change of state of the wellbore system may comprise a change in pumping rate of drilling fluid, an increase in rotation speed of the drillstring/coiled tubing in the borehole, an increase in motor speed of a downhole motor, a change in operation parameters of a wellbore tool, raising a drill bit/wellbore tool from a bottom of the borehole or from contacting an earth formation, increasing weight-on-bit and/or the like. Conventionally, a change in state of the wellbore system is directed to be made as-soon-as-possible when needed based upon measured/sensed data in order to adapt the wellbore system to changes as the wellbore procedure progresses. Previously, it has been recognized that wellbore systems, because of their configuration, may be associated with resonant frequencies and, in changing a state of the wellbore system, these frequencies may be avoided or filtered from the change of state process.

As discussed above, wellbore systems, like many large dynamic systems, exhibit resonant behaviour. A drillstring in rotation, changes of pressure and flow fluctuations in the borehole annulus are examples of large dynamic systems. Often the large dynamic systems are required to move between controlled set-points, for instance changing the rotation speed of the drillstring, changing the pressure-drop across a choke on the annulus and/or the like. Making changes in these resonant systems will often result in the development of large amplitude oscillations in the system, which may take a long time to die down, thereby interfering with the wellbore procedure and/or causing damage to equipment in the borehole.

For MPD systems it is often needed to control the wellbore pressure (at least over the open-hole section of the well) within a tight window. Thus, when the pump rate is changed the choke pressure is generally also changed to counter effects of changes in the hydraulic friction in the annulus. Typically pump rates change in less than 10 seconds, and the MPD system controller operates at even shorter timescales.

SUMMARY

An MPD controller operating at shorter timescales than a pump rate change is also generally operating faster than the acoustic travel time in a typical well. To compound the challenge, for most wells the acoustic travel time for pressure waves in the fluid in the annulus is significant compared to the time for control transients. If these factors are ignored, the pressure at the choke can be over-perturbed and the system can become unstable.

Accordingly, in a first aspect, an embodiment of the present invention provides a method for controlling a managed pressure drilling system including a drillstring located in a borehole, a pump which delivers drilling fluid to the interior of the drillstring, and a choke which controls the flow of drilling fluid from an annulus formed between the outside of the drillstring and the wall of the borehole, in use, the drilling fluid flowing downwardly through the drillstring from the pump, exiting the drillstring through a bottomhole drill bit, and returning upwardly through the annulus to the choke, the method including:

determining a correction $\Delta V_{corr}$ in the volume of the fluid in the annulus to achieve a target pressure in the fluid at a point in the system;
  calculating a choke flow rate correction term $\Delta q_{corr}$ by dividing $\Delta V_{corr}$ by a factor related to the acoustic travel time $t_a$ of a pressure wave in the fluid travelling the length of the annulus (for example, $\Delta q_{corr}$ can simply equal $\Delta V_{corr}/t_a$); and
  determining a flow demand from the choke on the basis of a $\Delta q_{corr}$.

In such embodiments, the determined flow demand may be used to limit the rate of change of the flow from the choke out of the annulus, thereby countering effects of the acoustic travel time.

The method of the first aspect may have any one or, to the extent that they are compatible, any combination of the following optional features.

The target pressure may comprise a pressure in the fluid at a point in the annulus.

For example, it may be the bottomhole pressure, or the fluid pressure at another point in an open hole section of the annulus.

The method may further include receiving a measurement of the pressure in the fluid at a point in the system. In this case, $\Delta V_{corr}$ may be determined on the basis of the target pressure and the measured pressure. Although the fluid in the well is generally almost incompressible and the wellbore almost rigid, the compliance in the system can be enough to change the pressure in the well. Accordingly, in some embodiments, the determination of $\Delta V_{corr}$ can account for the compliance of the fluid and/or for the compliance of the wellbore. The measured pressure may be at the same point in the system as the target pressure, or it can be at another point. However, in many embodiments, the measured pressure is a pressure in the fluid at a point in the annulus.

The determination of the flow demand from the choke may further include compensating for fluid flow into the annulus from the drill bit. For example, some embodiments may further include: receiving a measurement of the pump pressure and receiving a measurement of the choke pressure; and inputting the measured pump and choke pressures into a wellbore model to determine the fluid flow into the annulus from the drill bit. This approach allows the fluid flow into the annulus to be determined without a measurement of the concurrent pump rate, such measurements being susceptible to error, e.g. due to the unreliability of pump stroke counters.

Indeed, more generally, in a second aspect, embodiments of the present invention provide a method for controlling a drilling system (e.g. a managed pressure drilling system) including a drillstring located in a borehole, a pump which delivers drilling fluid to the interior of the drillstring, and a choke which controls the flow of drilling fluid from an annulus formed between the outside of the drillstring and the wall of the borehole, in use, the drilling fluid flowing downwardly through the drillstring from the pump, exiting the drillstring through a bottomhole drill bit, and returning upwardly through the annulus to the choke, the method including:

receiving a measurement of the pump pressure and receiving a measurement of the choke pressure;

inputting the measured pump and choke pressures into a wellbore model to determine the fluid flow into the annulus from the drill bit; and determining a flow demand from the choke and/or a flow demand from the pump to compensate for the determined fluid flow into the annulus.

Thus the method of the second aspect, although particularly useful in relation to control of a managed pressure drilling system has broader applicability to control of other drilling systems, and especially to systems where pump flow rate measurements are susceptible to error. For example, the method is applicable to systems where a knowledge of the system flow rate is critical and pump measurements are difficult or unreliable. In particular, dual gradient type MPD operations typically have an additional pump in the system which is controlled dependent on the flow through the bit.

The method of the first or second aspect may have any one or, to the extent that they are compatible, any combination of the following optional features.

The method may further include determining a choke position demand based on the choke flow demand. For example, the method may further include receiving a measurement of the choke position, and also receiving a measurement of the choke pressure if not already received. The determination of the choke position demand can then be based on the choke flow demand accounting for the measured choke position and the measured choke pressure. In particular, a calibration of the choke position to choke discharge coefficient can be used to characterize the choke, which may then be controlled on the choke position and the choke pressure drop.

The method may further include measuring any one or more of: the fluid pressure at a point in the system, the pump pressure, the choke pressure, and the choke position.

The method may further include actuating the choke in accordance with the choke position demand.

Further aspects of embodiments of the present invention provide: a computer program comprising code which, when run on a computer, causes the computer to perform the method of the first or second aspect; a computer readable medium storing a computer program comprising code which, when run on a computer, causes the computer to perform the method of the first or second aspect; and a computer-based control system programmed to perform the method of the first or second aspect.

For example, a computer-based control system can be provided including one or more processors configured to: determine $\Delta V_{corr}$ to achieve a target pressure in the fluid at a point in system; calculate $\Delta q_{corr}$ by dividing $\Delta V_{corr}$ by a factor related to $t_a$; and determine a flow demand from the choke on the basis of $\Delta q_{corr}$. Such a system thus corresponds to the method of the first aspect.

In another example, a computer-based control system can be provided including one or more processors configured to: receive a measurement of the pump pressure and receive a measurement of the choke pressure; input the measured pump and choke pressures into a wellbore model to determine the fluid flow into the annulus from the drill bit; and determine a flow demand from the choke to compensate for the determined fluid flow into the annulus. Such a system thus corresponds to the method of the second aspect.

The computer-based control system may include respective measurement sensors (e.g. operatively connected to the one or more processors) for measuring any one or more of: the fluid pressure at a point in the system, the pump pressure, the choke pressure, and the choke position.

The computer-based control system may include a choke position actuator (e.g.

operatively connected to the one or more processors) for receiving the choke position demand and actuating the choke in accordance with the choke position demand.

In a further aspect, embodiments of the present invention provide a drilling system including a drillstring located in a borehole, a pump which delivers drilling fluid to the interior of the drillstring, a choke which controls the flow of drilling fluid from an annulus formed between the outside of the drillstring and the wall of the borehole, in use, the drilling fluid flowing downwardly through the drillstring from the pump, exiting the drillstring through a bottomhole drill bit, and returning upwardly through the annulus to the choke, and a computer-based control system according to the previous aspect for controlling drilling system. In the case that the computer-based control system is programmed to perform the method of the first aspect, the drilling system is a managed pressure drilling system. In the case that the computer-based control system is programmed to perform the method of the second aspect, the drilling system can be, but is not necessarily, a managed pressure drilling system.

BRIEF DESCRIPTION OF THE DRAWINGS

Embodiments of the invention will now be described by way of example with reference to the accompanying drawings in which.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments.

However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
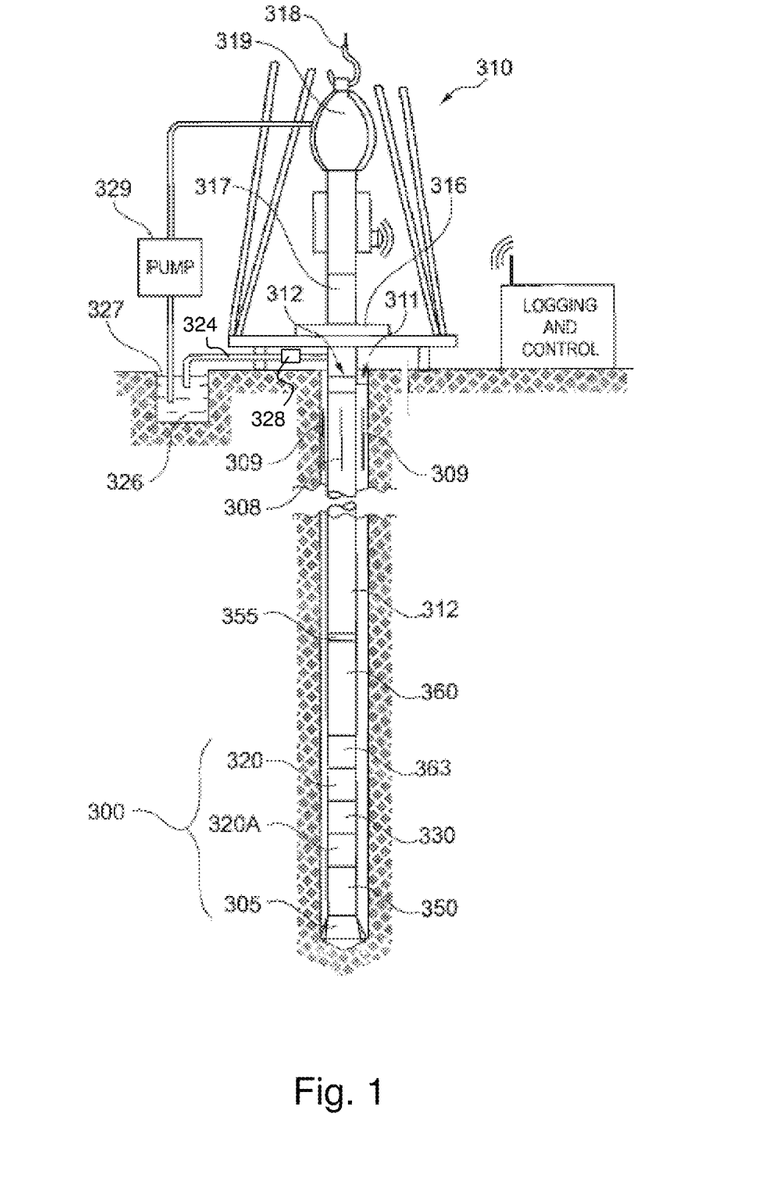
FIG. 1 illustrates an MPD drilling system for operation at a well-site to drill a borehole through an earth formation.

FIG. 1 illustrates an MPD drilling system for operation at a well-site to drill a borehole through an earth formation. The well-site can be located onshore or offshore. In this system, a borehole 311 is formed in subsurface formations by rotary drilling in a manner that is well known. The invention can also use be used in directional drilling systems, pilot hole drilling systems, casing drilling systems and/or the like.

A drillstring 312 is suspended within the borehole 311 and has a bottomhole assembly 300, which includes a drill bit 305 at its lower end. The surface system includes a platform and derrick assembly 310 positioned over the borehole 311, the assembly 310 including a rotary table 316, kelly 317, hook 318 and rotary swivel 319. The drillstring 312 can be rotated by the rotary table 316, energized by means not shown, which engages the kelly 317 at the upper end of the drillstring. The drillstring 312 is suspended from a hook 318, attached to a traveling block (also not shown), through the kelly 317 and the rotary swivel 319 which permits rotation of the drillstring relative to the hook. A top drive system could alternatively be used to rotate the drillstring 312 in the borehole and, thus rotate the drill bit 305 against a face of the earth formation at the bottom of the borehole.

The surface system further includes drilling fluid or mud 326 stored in a pit 327 formed at the well site. A pump 329 delivers the drilling fluid 326 to the interior of the drillstring 312 via a port in the swivel 319, causing the drilling fluid to flow downwardly through the drillstring 312 as indicated by the directional arrow 308. The drilling fluid exits the drillstring 312 via ports in the drill bit 305, and then circulates upwardly through the annulus region between the outside of the drillstring and the wall of the borehole, as indicated by the directional arrows 309. The fluid exits the annulus at a side port into a return line 324, an adjustable choke 328 being operated to restrict flow of the drilling fluid along the return line and thereby applying a back-pressure to the annulus. The drilling fluid thus lubricates the drill bit 305 and carries formation cuttings up to the surface as it is returned to the pit 327 for recirculation.

The bottomhole assembly 300 of the illustrated system may include a logging-while-drilling (LWD) module 320, a measuring-while-drilling (MWD) module 330, a rotary-steerable system and motor, and drill bit 305.

The LWD module 320 may be housed in a special type of drill collar, as is known in the art, and can contain one or a plurality of known types of logging tools. It will also be understood that more than one LWD and/or MWD module can be employed, e.g. as represented at 320A. The LWD module may include capabilities for measuring, processing, and storing information, as well as for communicating with the surface equipment. In one embodiment, the LWD module may include a fluid sampling device.

The MWD module 330 may also be housed in a special type of drill collar, as is known in the art, and can contain one or more devices for measuring characteristics of the drillstring and drill bit. The MWD tool may further include an apparatus (not shown) for generating electrical power to the downhole system. This may typically include a mud turbine generator powered by the flow of the drilling fluid, it being understood that other power and/or battery systems may be employed. The MWD module may include one or more of the following types of measuring devices: a weight-on-bit measuring device, a torque measuring device, a vibration measuring device, a shock measuring device, a stick slip measuring device, a direction measuring device, a rotation speed measuring device, and an inclination measuring device.

Figure 2:
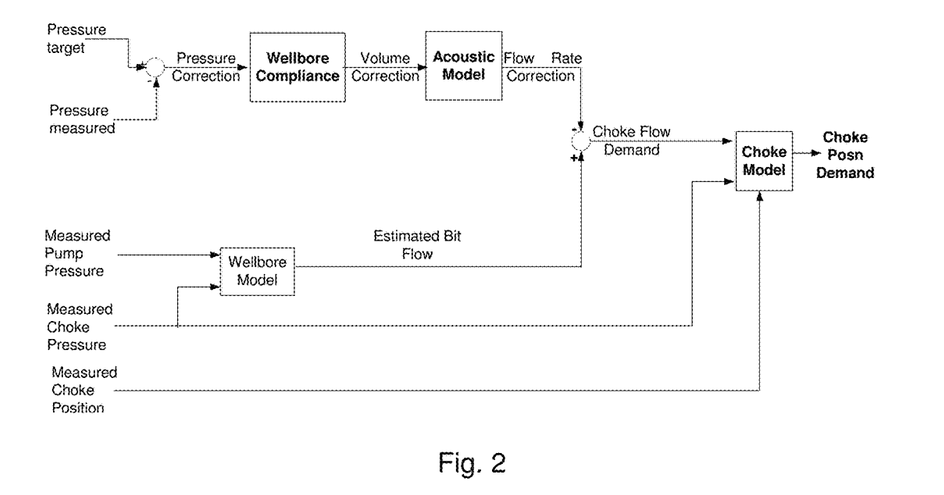
FIG. 2 shows schematically a controller for the MPD drilling system of FIG. 1.

FIG. 2 shows schematically a controller for the MPD drilling system of FIG. 1.

The fastest transients the controller should be able to manage are an emergency shutdown of the pumps (which typically takes a few seconds) and accelerating the blocks when tripping (typically also a few seconds). In both cases changes in condition will take place over timescales corresponding to 1 Hz or faster. The controller can be operated at comparable speeds.

A controller gain of one can be used, although more complex controllers, such as a PID controller, can be used if beneficial.

The inputs to the controller are a target fluid pressure, the measured fluid pressure, the measured pump pressure, the measured choke pressure and the measured choke position. The output is the choke position demand.

The measurement inputs can be obtained from suitably positioned sensors in the well, at the pump and at the choke.

The choke position demand can be sent as a command signal to a choke actuator which acts on the signal to move the choke position.

The measured and target pressures can be for any point in the system, surface or down hole. However, typically, the target pressure is a pressure in the annulus, for example the bottom hole pressure or the pressure at another point in an open-hole section of the annulus. The measured pressure can be a direct measurement or a derivation from a wellbore model. An example of a model derived measurement is the bottom hole pressure derived from a measured choke pressure using a hydraulic friction correction.

The target and measured pressures can be combined to derive a pressure error $P_{err}$. This can then be used with a model of the wellbore compliance to calculate a correction $\Delta V_{corr}$ in the volume of fluid to be removed from (or added to) the well to correct the pressure error. In general, the pressure drop in the bit is large so changes in the annulus pressure have a small effect on the fluid in the stand pipe (the interior of the drill pipe). Hence we can consider only the annular fluid and the compliance of the wellbore wall and near wellbore fluids. The effective compliance $C_a$ of the annular volume is defined as:

$$\Delta V_{corr} = C_a \Delta P_{err}$$

and, following the approach of WO 2011/036144 A1 (hereby incorporated by reference in its entirety for all purposes), can be calculated from the fluid properties and the annular volume as:

$$C_a = \frac{V_a}{k} = \frac{L_a A_a}{k}$$

where k is the bulk modulus of the fluid and $L_a$, $A_a$ and $V_a$ are the length, cross sectional area and volume of the annulus. For clarity, changes in the cross section and formation elasticity have been neglected, although these can be incorporated into the model without difficulty, as described in WO 2011/036144 A1.

Another option, is to measure the compliance directly as proposed in Bourgoyne et al., "APPLIED DRILLING ENGINEERING", Society of Petroleum Engineers, ISBN 1-55563-001-4, and in U.S. provisional patent application No. 61/880,074, filed 19 Sep. 2013 (both hereby incorporated by reference in their entireties for all purposes).

The acoustic delay associated with the liquid sound speed in the drilling system is significant compared to the desired speed of the controller. Thus, the limiting rate that the pressure in the well can be corrected is the sound speed for a pressure wave moving down the annulus. If c is the speed of sound in the fluid in the annulus, and can be derived theoretically or measured e.g. with wired drill pipe, the acoustic travel time $t_a$ is then:

$$t_a = \frac{L_a}{c}.$$

It follows that the limiting flow rate correction $\Delta q_{corr}$ is $$\Delta q_{corr} = \frac{\Delta V_{corr}}{t_a}.$$

For shallow wells a lower limit for the acoustic travel time is typically 1 second.

If the wellbore is assumed to be rigid, the sound speed c can be written as:

$$c = \sqrt{k/\rho}$$

and the flow rate correction can be written as:

$$\Delta q_{corr} = \frac{A_a}{\sqrt{k\rho}} \Delta P err.$$

A different theoretical approach is to replace the compliance and acoustic models with a water hammer approximation, in which the fastest method to change the pressure in a tube is considered to be with a water hammer pressure wave. In this case:

$$\Delta P = \rho c \Delta v$$

where $\Delta P$ is the pressure rise across the wave and $\Delta v$ the change in fluid velocity, as shown by Massey, B. S., "MECHANICS OF FLUIDS", Van Nostrand Reinhold, ISBN 0 278 00047 9 (hereby incorporated by reference in its entirety for all purposes). Inverting this and substituting for sound speed leads to:

$$\Delta q_{corr} = \frac{A_a}{\sqrt{k\rho}} \Delta P err$$

which is the same solution as that derived using the compliance and acoustic correction approach.

To the flow rate correction $\Delta q_{corr}$ can be added the estimated bit flow (i.e. the fluid flow into the annulus from the interior of the drill pipe at the bit) to calculate the total demanded flow rate out of the well at the choke to correct the pressure. The estimated bit flow can be determined in a number of ways, such as:

From the pump flow rate assuming the fluid in the drill pipe is incompressible;
From the pump flow rate corrected for the compressibility of the fluid in the drill pipe, e.g. using methods similar to those proposed in WO 2011/036144 A1,
From the pump pressure and the choke pressure, using a wellbore model which accounts for friction in the system to estimate the circulation rate, and thereby eliminating a need for a pump stroke counter to provide a concurrent pump flow rate;
From the flow rate through the choke; and
From a combination of the above.

The controller of FIG. 2 uses the wellbore model approach to determine bit flow from the measured pump and choke pressures.

The wellbore model can take the form of a defined mathematical relation between the bit flow rate and frictional pressure drop. Alternatively the model can be a look up table which may include interpolation between data points. The model can be derived from a simple hydraulics calculation based on the known wellbore geometry and fluid properties. However, another option is for the model to be derived from a more comprehensive wellbore hydraulics model. Yet another option is for the model to be a calibration of flow rate measurements (into and/or out of the well) correlated to actual pressure measurements.

Measurements from a pump stroke counter can be used to correlate pump flow rate with measured pressures, and thereby calibrate the model. However, significantly, although the model can be continuously updated, the actual measurements used for the model do not need to be concurrent, i.e. they can lag (e.g. by up to a matter of hours in some cases) behind the controller giving ample opportunity for incorrect pump rate data from unreliable pump stroke counters to be rejected.

Having determined a desired choke flow demand, the corresponding choke position to achieve that flow rate can then be calculated e.g. using a choke map which can be derived theoretically, from the manufacturer's curve, or by calibration. See for example U.S. provisional patent application No. 61/822,146, filed 10 May 2013 and co-pending PCT application no. PCT/US2014/037744, filed 12 May 2014 (both hereby incorporated by reference in their entireties for all purposes). The measured choke pressure can be used for the calculation. Calibration of the choke discharge coefficient versus choke position can be performed using water, drilling mud or other appropriate fluid.

As shown above, the controller captures the physics of the compliance and acoustics of the drilling system, yet in principle is simple. This simplicity can bring benefits in terms of verifying and validating the controller.

A controller of the type illustrated in FIG. 2 has been built and tested in the Schlumberger test well in Bottesford, UK and the Louisiana State University (LSU) test facility in Baton Rouge, La. It has also been tested in a simulator against dynamic hydraulic models.

Figure 3:
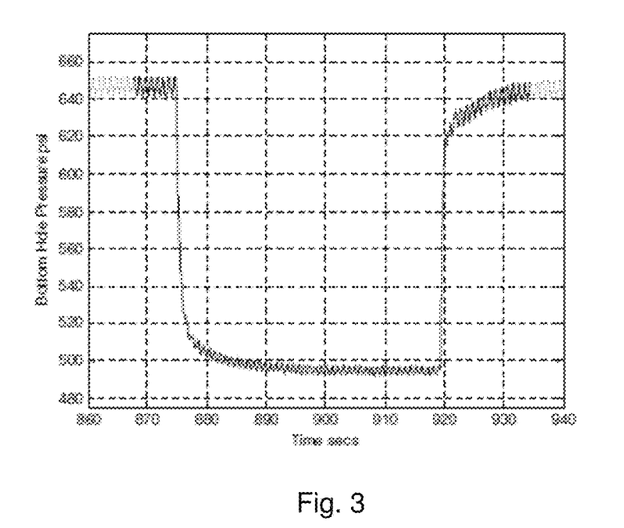
FIG. 3 shows a bottomhole pressure trace for data recorded in a 1000 foot (304.8 meter) well in Bottesford in response to a step change in target pressure.

FIG. 3 shows a bottomhole pressure trace for data recorded in the 1000 ft (304.8 m) well in Bottesford in response to a step change in target pressure. The bottomhole pressure is within 20 psi (138 kPa) of target within 3 seconds.

Figure 4:
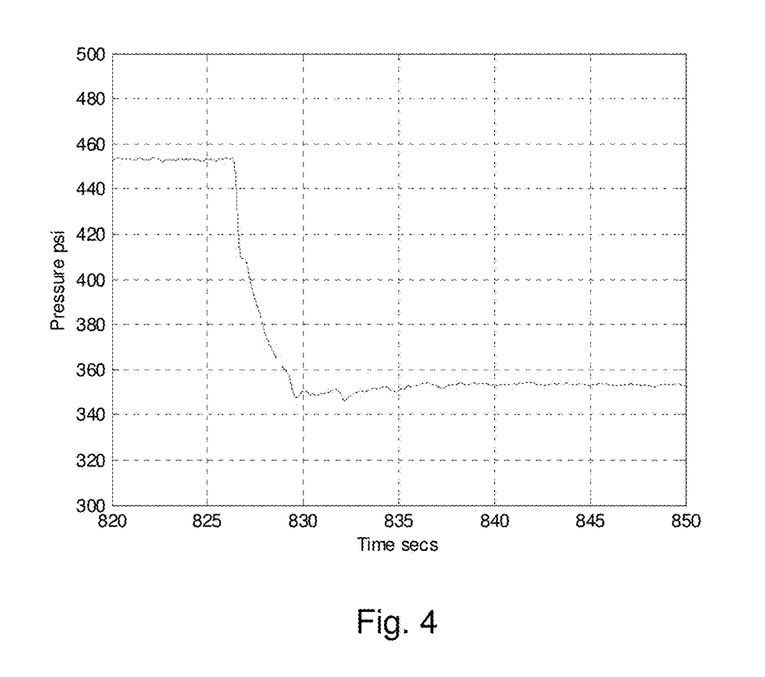
FIG. 4 shows a bottom hole pressure trace for data recorded in a 5000 foot (1524 meter) LSU test well in response to a step change in target pressure.

FIG. 4 shows a bottom hole pressure trace for data recorded in the 5000 ft (1524 m) LSU test well again in response to a step change in target pressure. The bottomhole pressure is within 10 psi (69 kPa) of target within 5 seconds.

Figure 5:
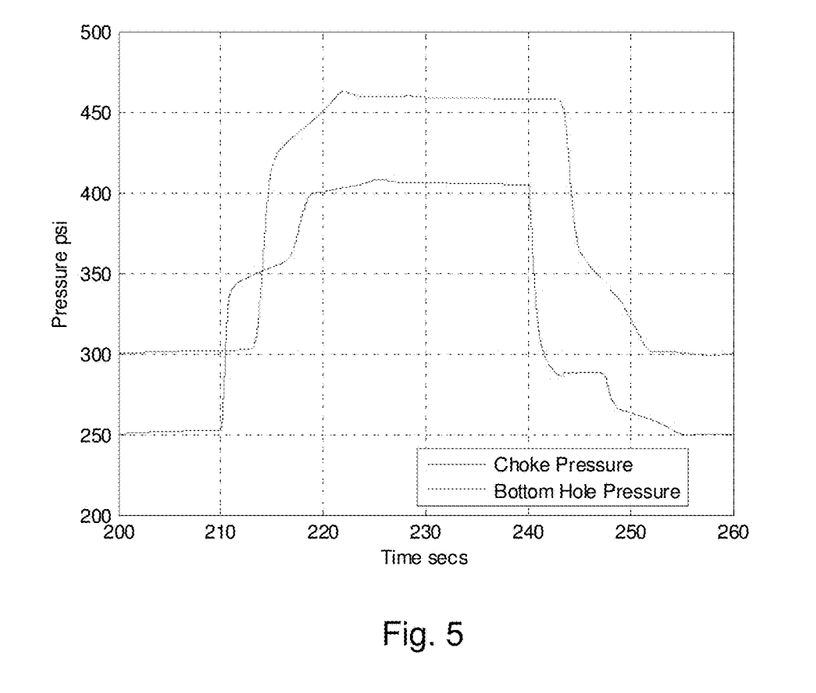
FIG. 5 shows choke pressure and bottomhole pressure simulator data for an 18,000 foot (5486.4 meter) well.

FIG. 5 shows choke pressure and bottom hole pressure simulator data for an 18,000 ft (5486.4 m) well. A dc shift is applied to the bottomhole pressure to remove the effect of the hydrostatic head on the bottom hole pressure and bring the plots on the same graph. The simulator data shows that the controller is able to produce targeted step changes in the bottom hole pressure by controlling the choke pressure, the time lag between changing the choke pressure and observing a corresponding change in the bottom hole pressure being close to optimal given the acoustic travel time in the well.

Figure 6A:
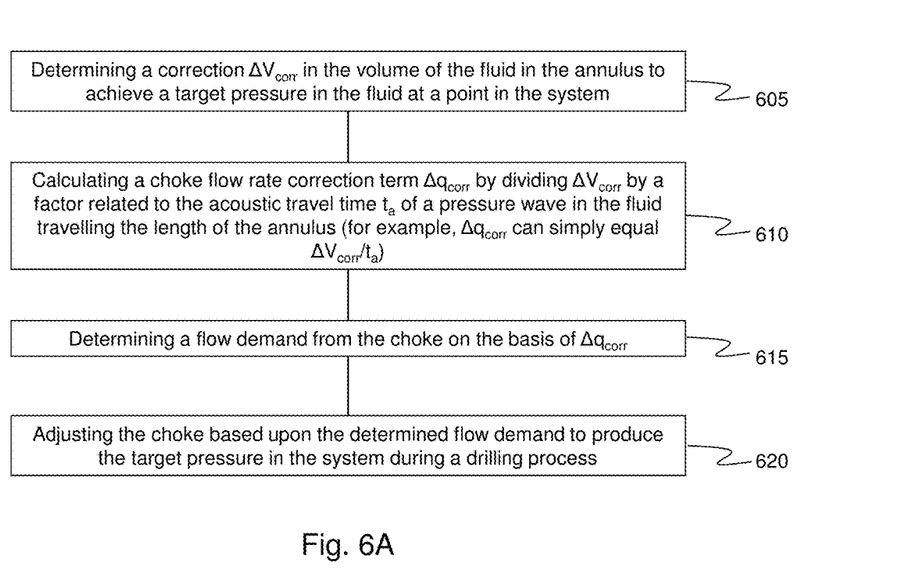
FIGS. 6A and 6B are flow-type descriptions of methods of controlling a drilling system during a drilling procedure in accordance with embodiments of the present invention.
Figure 6B:
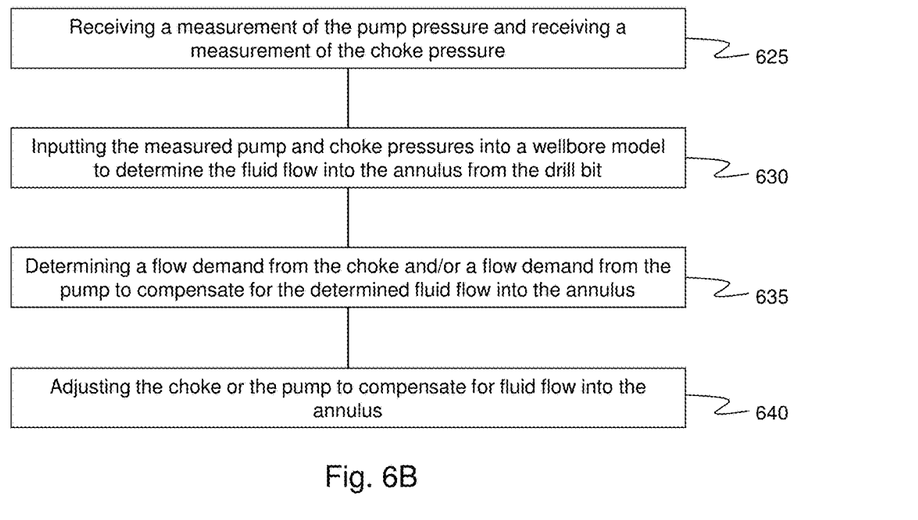

FIGS. 6A and 6B are flow-type descriptions of methods of controlling a drilling system during a drilling procedure in accordance with embodiments of the present invention.

In FIG. 6A, the drilling system, which comprises a MPD system, is operated to drill a borehole through an earth formation at a desired pressure, where the desired pressure is within a pressure window bounded by a fracture pressure of the formation and a pore pressure of the formation. In 605, a target pressure is determined for a location in the borehole being drilled and a correction volume to be added to or removed from the borehole is determined to achieve the target pressure.

In 610, a choke flow rate correction term is determined with respect to a rate of removing or adding fluid to the borehole. The flow rate correction term is determined from the correction volume and a factor relating to the acoustic travel time for a pressure wave to travel the length of the borehole/along the annulus.

In 615, a flow demand from the choke is determined from the choke flow rate correction term. And in 620, the choke is adjusted based upon the flow demand to produce the target pressure.

In FIG. 6B, a drilling system is operated to maintain a drilling pressure in a borehole being drilled through an earth formation within a desired pressure window, where the pressure window is designed to prevent fracturing of the formation and inflow of fluids from the formation into the borehole.

In 625, pump and choke pressures for the drilling system may be measured during the drilling procedure. In 630, a wellbore model is used to determine the fluid flow through a drilling bit of the drilling system into an annulus between the drilling system and the borehole. In the drilling procedure, drilling fluid is flowed through the drill bit to remove cutting, cool the drill bit etc. The flow rate through the drill bit may be used with the method described with respect to FIG. 6A to determine the flow demand from the choke.

In an embodiment of the present invention, fluid flow through the drill bit into the annulus may be determined using pressures and a model and without measuring pump rate, which may be problematic to measure and/or inaccurate. The flow of fluid into the annulus at a bottom of the borehole may produce pressure changes in the annulus that will not be detected at a surface location or along the annulus immediately. Furthermore, compressional and friction will affect the flow of the fluid in the wellbore and/or the pressures produced in the annulus by flow through the bit. The flow of fluid through the drill bit may be used to analyse/predict downhole pressures.

In 635, flow demand from the choke and/or the pump to compensate for the fluid flow through the drill bit is determined. And in 640, the choke and/or the pump are adjusted to compensate for the fluid flow into the annulus, which may provide for maintaining a pressure in the borehole/annulus within the pressure window.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

The invention claimed is:

1. A method for controlling a managed pressure drilling system including a drillstring located in a borehole having a length, a pump that delivers drilling fluid to an interior of the drillstring, and a choke that controls flow of drilling fluid from an annulus formed between an outside of the drillstring and an inner-wall of the borehole, in use, the drilling fluid flowing downwardly through the drillstring from the pump, exiting the drillstring through a drill bit at a downhole end of the drillstring, and returning upwardly through the annulus to the choke, the method comprising:

determining a correction $\Delta V_{corr}$ in the volume of the drilling fluid in the annulus to achieve a target pressure in the drilling fluid at a point in the system;

calculating a choke flow rate correction term $\Delta q_{corr}$ from $\Delta V_{corr}$ and an acoustic travel time $t_a$ of a pressure wave in the drilling fluid travelling the length of the borehole along the annulus;

determining a flow demand from the choke on the basis of $\Delta q_{corr}$; and adjusting the choke based upon the determined flow demand to produce the target pressure in the manacled pressure drilling system.

2. The method according to claim 1, further comprising:
receiving a measurement of the pressure in the drilling fluid at the point in the system; wherein $\Delta V_{corr}$ is determined on the basis of the target pressure and the measured pressure.

3. The method according to claim 1, wherein $\Delta q_{corr} = \Delta V_{corr}/t_a$.

4. The method according to claim 1, wherein the determination of the flow demand from the choke further includes compensating for fluid flow into the annulus from the drill bit.

5. The method according to claim 4, further comprising:
measuring a pump pressure and a choke pressure; and
inputting the measured pump and choke pressures into a wellbore model to determine the fluid flow into the annulus from the drill bit.

6. The method according to 5, further comprising:
determining a choke position demand based on a choke flow demand.

7. The method according to claim 6, further comprising:
receiving a measurement of the choke position; wherein the determination of the choke position demand accounts for the measured choke position and the measured choke pressure.

8. A computer program comprising non-transitory stored code which, when executed on a computer, causes the computer to perform the method of claim 1.

9. A computer readable, non-transitory storage medium storing a computer program comprising code which, when executed on a computer, causes the computer to perform the method of claim 1.

10. A computer-based control system comprising one or more processors programmed to perform the method of claim 1.

11. A managed pressure drilling system comprising:
a drillstring located in a borehole;
a pump which delivers drilling fluid to the interior of the drillstring;
a choke which controls the flow of drilling fluid from an annulus formed between the outside of the drillstring and the wall of the borehole, in use, the drilling fluid flowing downwardly through the drillstring from the pump, exiting the drillstring through a bottomhole drill bit, and returning upwardly through the annulus to the choke; and
computer-based control system according to claim 10 for controlling the managed pressure drilling system.

* * * * *